CENTERING AND CLAMPING ARRANGEMENT

Filed May 29, 1956 3 Sheets-Sheet 1

INVENTOR.
OTTO HOHNECKER
BY H. Walter [signature]
AGENT

INVENTOR.
OTTO HOHNECKER
BY [signature]
AGENT

INVENTOR.
OTTO HOHNECKER
BY [signature]
AGENT 2,937,916
Patented May 24, 1960

2,937,916

CENTERING AND CLAMPING ARRANGEMENT

Otto Hohnecker, Morrisville, Pa., assignor to Burroughs Corporation, Detroit, Mich., a corporation of Michigan Filed May 29, 1956, Ser. No. 587,989

8 Claims. (Cl. 346—137)

The present invention relates to turntables and more particularly to turntables provided with means for positioning and latching a disk thereon.

While of broader applicability, turntables in accordance with the present invention are particularly useful in computing apparatus utilizing replaceable magnetic memory disks for storing data. A problem in such apparatus has been in accurately registering the magnetic heads used to record and read-out data with the magnetic tracks in which information is stored on the memory disks.

An important object of the invention is the provision of a novel turntable construction provided with means for self-centering a disk thereon.

Another important object of the invention is to provide an improved turntable including means enabling quick and accurate centering of a replaceable magnetic memory disk upon a turntable with the information tracks on the disk in accurate registry with juxtaposed magnetic heads.

A more specific object of the invention is to provide such a turntable wherein the centering means cooperates with latch means for locking the disk in its centered position upon the turntable.

Still more specifically it is an object of the invention to provide such apparatus characterized by its simple, inexpensive construction well adapted for mass production.

Figure 7:
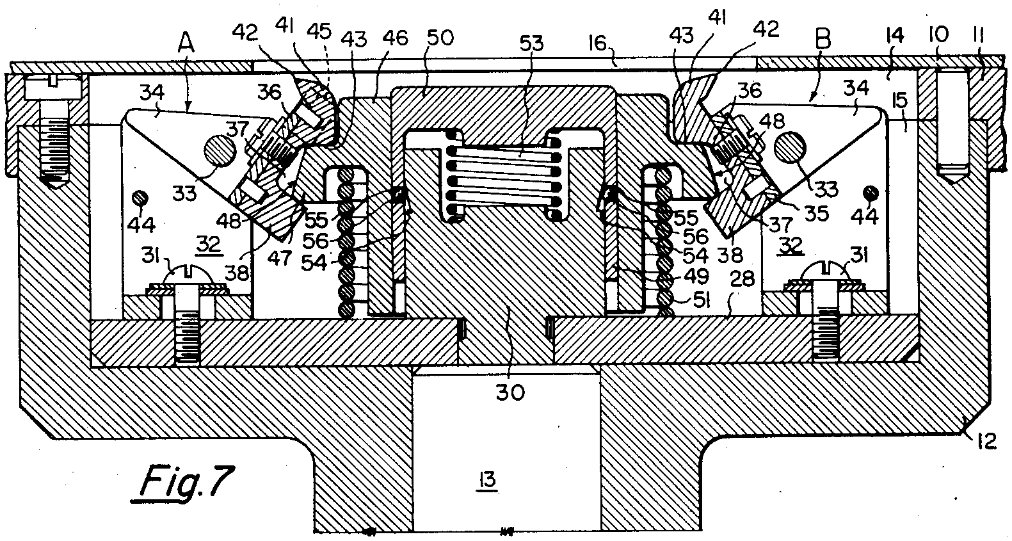
Figure 7 is a sectional view taken on line 7—7 of Figure 6, showing the latch mechanism in retracted position.

Referring to the drawings illustrating a preferred embodiment of the invention, and in particular to Figure 7 thereof, a magnetic memory disk 10 is shown mounted on a turntable 11 coaxially fixed to a hub 12, keyed or otherwise secured to a shaft 13 which is driven from a suitable source of power, not shown. Turntable 11 has a centrally disposed aperture 14 opening into a circular recess or socket 15 in hub 12. Disk 10 is provided with a center hole 16 of less diameter than aperture 14 but axially aligned therewith when properly seated upon the turntable.

Figure 5:
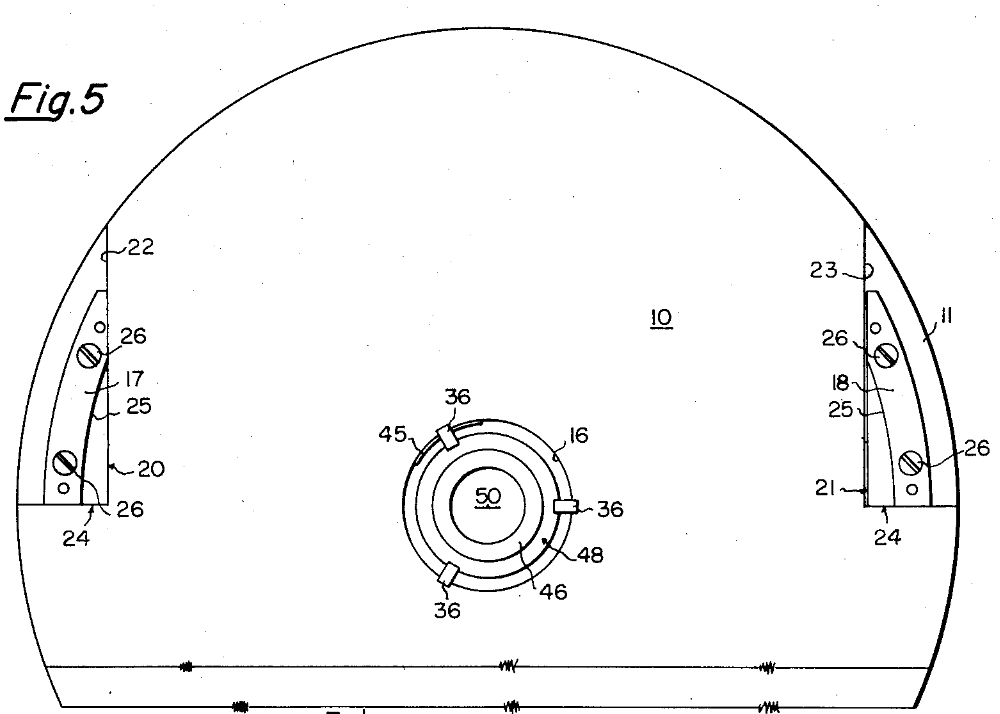
Figure 5 is a fragmentary plan view similar to Figure 1 but showing a magnetic memory disk in operative position on the turntable.
Figure 6:
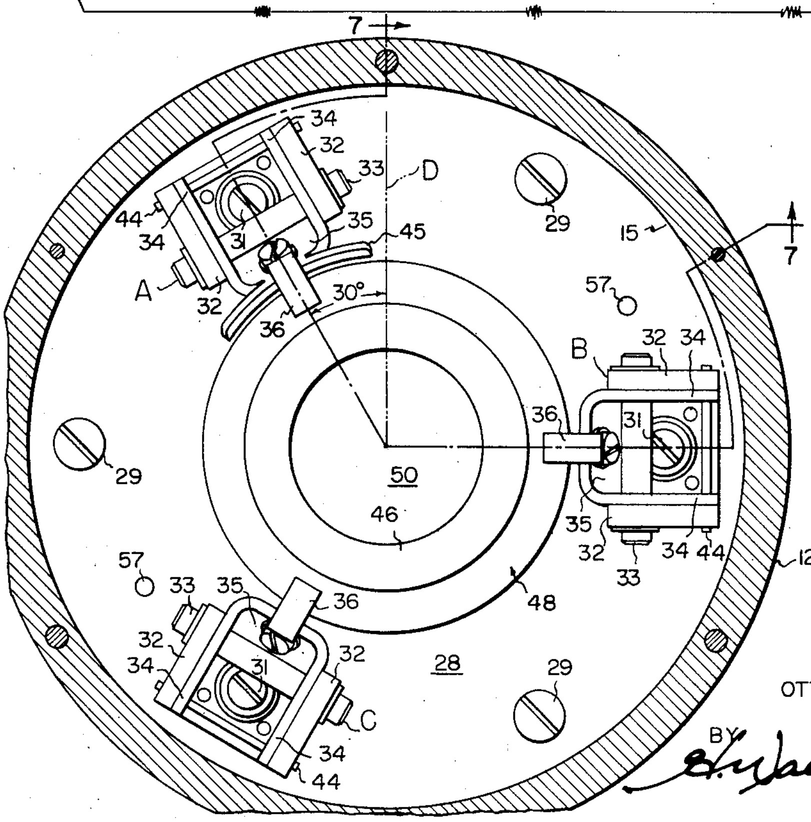
Figure 6 is a sectional view on an enlarged scale taken on line 6—6 of Figure 2.

For positioning disk 10 accurately centered upon turntable 11, as seen in Figure 5, two stop members 17 and 18 are fixed, as by screws 26, to the upper face of the turntable at opposite sides thereof to mate with two straight edges 20 and 21 comprising walls of two notches 22 and 23 formed in opposite side edges of disk 10. Edges 20 and 21 preferably lie normal to radially disposed stop edges 24, also comprising walls of notches 22 and 23.

Figure 1:
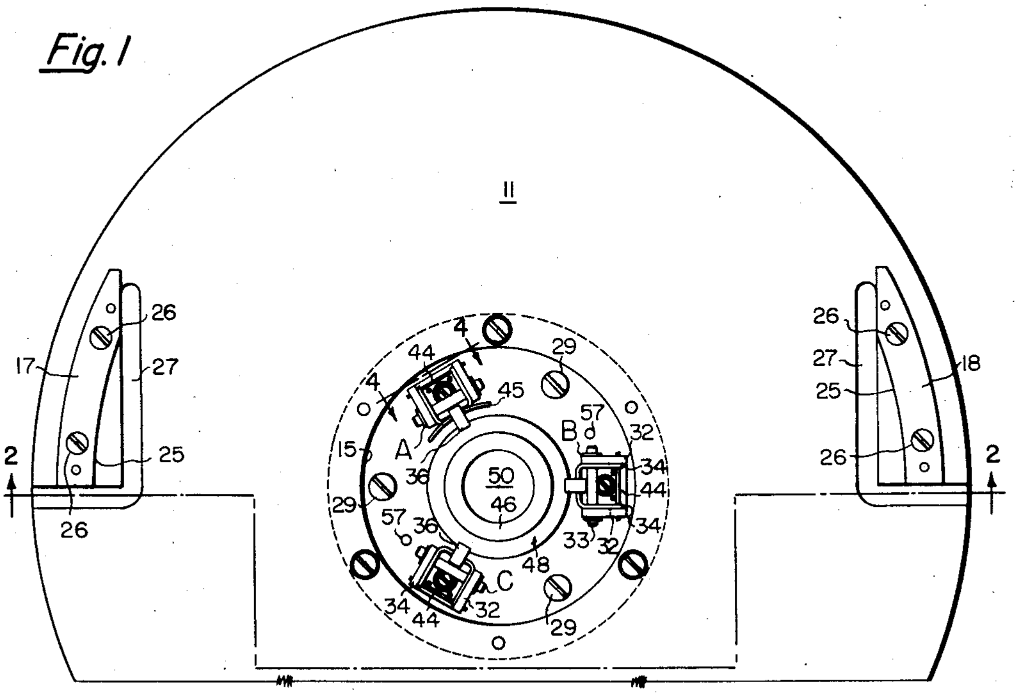
Figure 1 is a fragmentary plan view of a turntable embodying a preferred form of the present invention.
Figures 2, 3, 4:
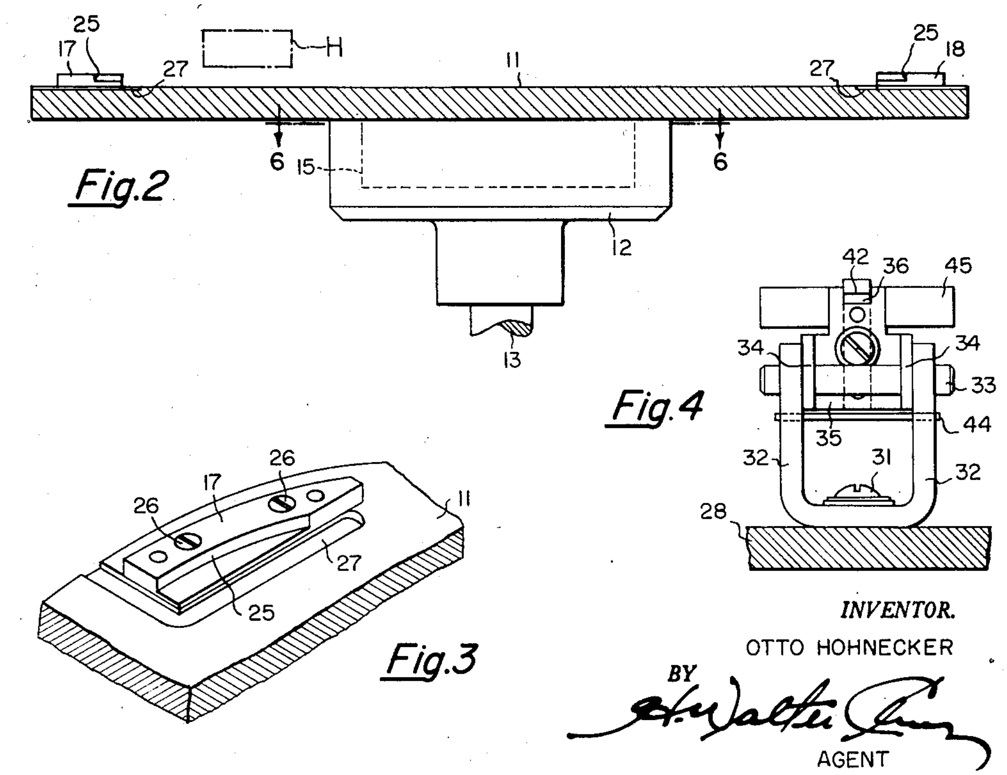
Figure 2 is a sectional view taken on line 2—2 of Figure 1.
Figure 3 is a fragmentary perspective view of a portion of the turntable showing a disk locating stop element.
Figure 4 is a detail in side elevation of a disk latch assembly.

As shown more clearly in Figure 3, each of stop members 17 and 18 has an outer raised portion having an arcuate inner face 25 generated on a radius preferably having the same center as the turntable. The lower portion of each stop member is so spaced as to permit disk 10 to slide into place between them (Figure 5) while arcuate faces 25 serve to deflect a misplaced entering disk into its proper position between the stops. As seen in Figures 1 and 3, each stop is bounded on two sides by a groove 27 formed in the turntable surface and conforming to the angular shape of the stop. Each of the grooves is open at one end to the turntable periphery. These grooves serve to collect any dirt or dust which otherwise might interfere with the required accurate seating of the disk against the stops. As the turntable comes up to operating speed the developed centrifugal force empties any collected dust through the open ends of the groove and is therefore self cleaning.

From the foregoing it will be seen that a disk 10 can be slid across the face of the turntable until notches 22 and 23 seat respectively against the stops 17 and 18. A control (not shown) may be supplied to bring the turntable to rest in a predetermined disk loading position with the stops facing the operator for convenient and quick interchange of disks. It should be understod that the stored magnetic information on the disk is in the form of discrete elements, each along one of a series of concentric circles or tracks, which are respectively arranged to pass beneath magnetic heads operatively located above the disk, one such head being indicated diagrammatically at H on Figure 2. Since the discrete elements of such memory disks are stored in closely spaced relation in the order of thousandths of an inch, it is obvious that precision matching of a disk with the heads is of utmost importance, as any variation in the position of a disk will render the read-out either inaccurate or distorted.

For the purpose of positively and accurately positioning and locking disk 10 in place upon the turntable with notches 22 and 23 seated respectively against stops 17 and 18, as seen in Figures 6 through 9, a plate 28 provided with an axially disposed post 30, is fixed in the bottom of recess 15 as by screws 29. Circumferentially arranged latch assemblies A, B and C (Figure 6) are anchored to plate 28 by screws 31, and spaced one hundred and twenty degrees apart, each at the same radial distance from the axis of the turntable.

Each latch assembly comprises a U-shaped bracket 32 (Figure 4) having a transverse pin 33 serving as a pivot for the spaced legs 34 of a one piece yoke 35 (Figure 6) to which a latch element or bolt 36 is attached. As seen more clearly in Figures 7 and 8, latch 36 has a transverse slot 37 forming an inwardly disposed radial abutment 38 at its lower end and a head 41 at its upper end, said head having a latching finger 42 projecting radially outwardly therefrom. That portion of the head 41, aligned above and spaced from abutment 38, is inclined downwardly over the slot 37 to provide a camming surface 43 by means of which latch 36 is rocked into position to lock disk 10 on the turntable. Excessive rocking motion of each bracket is limited by a cross pin 44 positioned in the path of movement of legs 34.

When plate 28 with its attached latch assemblies is fixed in place in recess 15, with the respective latch fingers 42 retracted, as seen in Figure 7, the top edges of fingers 42 lie below the plane of the upper surface of the turntable so that a disk 10 can be slid freely along the surface and beneath head H without striking the fingers. Likewise the fingers lie in a circle the diameter of which is less than the diameter of hole 16 in the disk so that the fingers can swing upwardly through hole 16 to overlie the disk. The latch assembly identified by the letter "A" carries a pusher member 45 having an arcuate face the arc of which is developed on substantially the same radius as disk hole 16 for a purpose which will presently be described.

Figure 8:
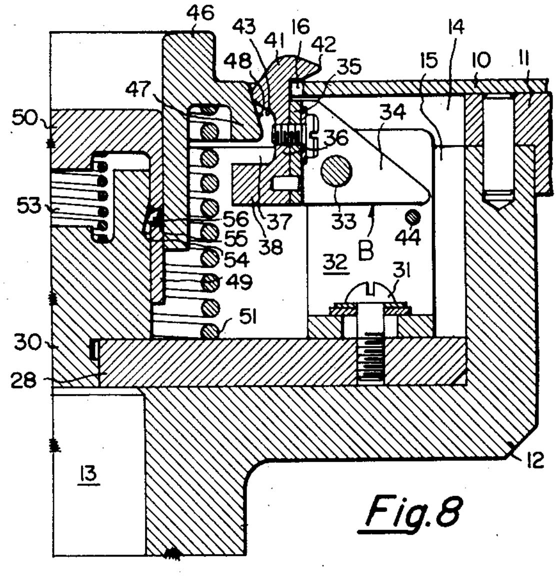
Figure 8 is a fragmentary sectional view showing a portion of the latch mechanism in extended locking position.
Figure 9:
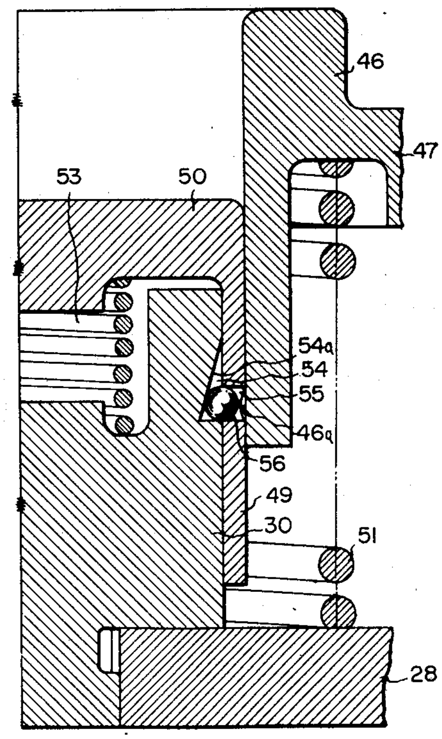
Figure 9 is a fragmentary sectional view on enlarged scale of latch control means.

With reference to Figures 7 and 8, it is seen that a cylindrical bushing 46 is provided having a circumferential flange 47 located and dimensioned to ride in latch slots 37 to actuate all of latches 36 simultaneously by the rise and fall of the bushing. Flange 47 has an outwardly and downwardly inclined rim 48 functioning as a cam to coact with the latch head camming surfaces 43 in this movement. Bushing 46 is slidably mounted for axial reciprocation upon the cylindrical body 49 of a push button 50 telescopically mounted over post 30 and normally biased to latch operating position by a compression spring 51 interposed between flange 47 and plate 28. A compression spring 53 interposed between the head of button 50 and post 30 normally biases the button upwardly to an extended position, but cooperates with other apparatus now to be described also to hold the bushing in a retracted position.

For locking bushing 46 in retracted position out of the plane of the top of the turntable to permit unhampered positioning of disk 10, thereon, the vertical wall of post 30 is formed with a circumferential groove 54 (Figure 9) having its inner surface 54*a* sloping inwardly and downwardly, and located in the plane of three angularly spaced holes 55 through wall 49 of button 50, and preferably spaced about one hundred and twenty degrees apart. Holes 55 open against wall 46*a* of bushing 46 so that freely rotatable balls 56 each having a diameter greater than the thickness of wall 49 and located in each of holes 55 provides a wedging friction interlock to hold bushing 46 in its retracted position, as seen in Figure 7. Pressing button 50 inwardly causes balls 56 to roll into the deeper end of groove 54, thereby permitting bushing 46 to move upwardly. Whereupon flange 47 rocks latch fingers 42 upwardly through disk hole 16 to a position above the surface of the disk, but preferably out of contact therewith though close enough to prevent excessive warping of the disk.

As a means for ensuring positive contact of disk walls forming notches 22 and 23 with their respective stops 17 and 18, the latching bracket A having arcuate pusher 45 thereon is so located as to produce an angular thrust of the disk toward one of the turntable stops, for example 17. This angular setting of pusher 45 is provided by a predetermined orientation of attaching plate 28 in socket 15 with respect to hub 12, by means of two dowel pins 57 (Figure 6) at diametrically opposite points of the recess floor and angularly with respect to a radius D. For registering with dowel pins 57, plate 28 is provided with matching holes so that the latch assembly unit A has its permanent angular displacement when the plate is bolted in this predetermined position. Illustratively this angular relation is in the order of thirty degrees from radius D as that has been found to give the desired thrust for effective contact of disk notch 22 with its stop 17.

From the above it is seen that the latching unit of the invention in the present combination makes possible the rapid interchange of disks without disturbing the matching relationship of the magnetic tracks on the disks with the juxtaposed magnetic heads. With the present novel unit it is now possible to stop the turntable, quickly release and slide a disk from the turntable, slide and latch another disk in place, and resume operation all in the matter of a few seconds. This result is made possible largely by the automatic positioning of the disk with respect to the magnetic heads whereby time consuming manual manipulation of a disk to its critical operating position is eliminated.

More specifically, the operation of the apparatus may be described in the following manner. With bushing 46 locked in retracted position, as seen in Figure 7, so that latches 36 are out of the path of movement, a disk is slid along the surface of the turntable beneath head H until notches 22 and 23 seat against stops 17 and 18. Button 50 is pressed downwardly unlocking the wedge clutch so that spring 51 may elevate bushing 46 to rotate latch fingers 42 through disk hole 16 while at the same time flange cam 48 rocks the latches to bring fingers 42 above the margin of the hole. Simultaneously pusher 45 engages the rim of hole 16 and thrusts the disk angularly into firm contact with stop 17. Thus the critical matching of the magnetic tracks on the disk with the magnetic heads is assured for read-out or otherwise. In removing the disk the turntable is brought to rest, properly position with respect to the user whereupon bushing 46 is manually pressed down to its retracted position thereby withdrawing the latches below the plane of the turntable to allow the disk to be removed. When bushing 46 is retracted the wedge clutch locks it in this position until released for latching of another disk. This cycle is repeated as each disk is inserted and removed and with a time interval of only seconds for each cycle.

It will now be apparent that the invention provides a complete unitary positioning and latching control for accurately centering individual memory disks upon a turntable in operative relation to a magnetic head for storage and/or read-out functions. The assembly being such that removal and replacement of the disks can be made in a matter of seconds through the above described retractable latch unit arranged for two position operation, retracted to leave the turntable surface unobstructed for sliding a disk into place, and projected for locating and holding a disk with the circular tracks of discrete magnetic information properly registered with associated magnetic heads. It is obvious that disks may be removed and replaced repeatedly with the same high degree of accuracy.

What is claimed is:

1. A turntable construction for rotatably supporting a member thereon comprising: a turntable for carrying said member; means for rotating said turntable about an axis; said turntable having a planar member carrying surface, a coaxial recess therein, and stop means extending above the plane of said surface on diametrically opposite sides thereof and in positions to engage complementary means formed on the peripheral edge of said member when said member is slid across said planar surface; and means within said recess movable between extended and retracted positions selectively to latch said member to said table or to release it for removal from said turntable; said last means when in retracted position being wholly within said recess below said planar surface of said table, and when in said extended position extending above said surface.

2. A turntable according to claim 1 wherein said member comprises an apertured disk having abutment means formed in opposite peripheral edge portions, and said latch means includes a plurality of latch elements adapted to engage said disk about the periphery of said aperture, and one of which is adapted to urge said disk against said stop means.

3. In a magnetic storage system: a turntable having a record bearing planar surface and a center aperture; means for rotating said turntable; a memory disk having a hole for coaxial registration with said aperture; means to so locate said disk; said locating means comprising spaced coacting stops projecting from the record bearing surface of said turntable, and spaced notches on the outer peripheral edge of said disk; means within said aperture and projectable through said disk hole for holding said disk registered; and means including a reciprocable member for actuating said projectable means.

4. In a magnetic storage system: a turntable having a record bearing planar surface and a center aperture; means for rotating said turntable; a memory disk having a hole for coaxial registration with said aperture; means to so locate said disk; said last means comprising coacting stops projecting from opposite edge portions of said planar surface; means within said aperture in an inoperative position and projectable through said disk hole to an operative position for holding said disk so registered; said projectable means including a plurality of pivoted latches distributed about the inner periphery of the turntable walls forming said aperture, and a retractable pusher carried by one of said latches for moving said disk against said stop elements when said latches are moved to operative position; and means including a reciprocable member for actuating said projectable means.

5. A construction according to claim 3 wherein said stops include camming surfaces for guiding misplaced disks into accurate registry with said stops.

6. In a magnetic storage system, a turntable having a planar surface and a center aperture, means for rotating said turntable, a planar memory disk having a hole for coaxial registration with said turntable aperture and two peripheral notches located on substantially diametrically opposite rim portions thereof, two stops projecting from the planar surface of said turntable to be respectively engaged by said notches to locate said disk in registered position, and means engaging the rim of said disk hole to move and hold said disk against one of said stops.

7. In a magnetic storage system according to claim 6 wherein said turntable has a groove adjacent each stop and opening radially of said turntable, whereby foreign matter accumulating in said grooves is discharged by centrifugal force generated by rotation of said turntable.

8. A magnetic storage system comprising: a turntable having a center recess; a magnetic memory disk having a hole and two spaced apart peripheral notches formed in substantially diametrically opposite rim portions thereof; two spaced apart stop elements on said turntable adapted to engage said disk within said notches in a manner to locate said disk on said turntable with said disk hole registered with said turntable recess; means within said recess adapted to be moved into engagement with the rim of said disk hole when the latter is over said recess and to exert a force against said disk in a radial direction displaced angularly less than 90° from a line drawn between the points of contact of said disk with said stop elements thus to move said disk firmly against said stop elements; and means for so moving said last means.

References Cited in the file of this patent

UNITED STATES PATENTS

| | | |
|---|---|---|
| 1,363,903 | Neher | Dec. 28, 1920 |
| 1,874,550 | Kuhn | Aug. 30, 1932 |
| 1,904,490 | Mallina | Aug. 18, 1933 |
| 2,068,449 | Downs | Jan. 19, 1937 |
| 2,826,418 | Johnson | Mar. 11, 1958 |